(12) United States Patent
Rachwal et al.

(10) Patent No.: US 11,655,402 B2
(45) Date of Patent: *May 23, 2023

(54) BASIC IONIC LIQUIDS COMPOSITIONS AND ELEMENTS INCLUDING THE SAME

(71) Applicant: NITTO DENKO CORPORATION, Osaka (JP)

(72) Inventors: Stanislaw Rachwal, Oceanside, CA (US); Tissa Sajoto, Carlsbad, CA (US); Yufen Hu, San Diego, CA (US); Hongxi Zhang, Temecula, CA (US); Peng Wang, San Diego, CA (US)

(73) Assignee: NITTO DENKO CORPORATION, Osaka (JP)

( * ) Notice: Subject to any disclaimer, the term of this patent is extended or adjusted under 35 U.S.C. 154(b) by 341 days.

This patent is subject to a terminal disclaimer.

(21) Appl. No.: 16/765,646

(22) PCT Filed: Nov. 20, 2018

(86) PCT No.: PCT/US2018/061945
§ 371 (c)(1),
(2) Date: May 20, 2020

(87) PCT Pub. No.: WO2019/104002
PCT Pub. Date: May 31, 2019

(65) Prior Publication Data
US 2020/0299552 A1  Sep. 24, 2020

Related U.S. Application Data

(60) Provisional application No. 62/589,373, filed on Nov. 21, 2017.

(51) Int. Cl.
*C09J 133/02* (2006.01)
*C09J 7/38* (2018.01)
(Continued)

(52) U.S. Cl.
CPC .............. *C09J 133/02* (2013.01); *C09J 7/10* (2018.01); *C09J 7/385* (2018.01); *C09J 9/02* (2013.01);
(Continued)

(58) Field of Classification Search
CPC ............... C09J 133/02; C09J 2301/408; C09J 2301/502; C09J 2433/00; C09J 7/385;
(Continued)

(56) References Cited

U.S. PATENT DOCUMENTS 4,099,007 A  7/1978 Kraft et al.
5,554,664 A  9/1996 Lamanna et al.
(Continued)

FOREIGN PATENT DOCUMENTS

CN  1177346 A  3/1998
CN  102449092 A  5/2012
(Continued)

OTHER PUBLICATIONS

Office Action in corresponding Chinese patent application, 201880086840.0, dated Aug. 26, 2021; English machine translation also attached.
(Continued)

*Primary Examiner* — Scott R. Walshon
(74) *Attorney, Agent, or Firm* — Maschoff Brennan; Brent Johnson; David Old

(57) ABSTRACT

An electrically debondable adhesive composition is described. The adhesive is comprised of a basic ionic liquid and an optionally crosslinked polymer, wherein the basic ionic liquid is comprised of an amino-ammonium cation and a bis(fluorosulfonyl)imide anion.

19 Claims, 3 Drawing Sheets

(51) Int. Cl.
*C09J 7/10* (2018.01)
*C09J 9/02* (2006.01)
*C08K 5/19* (2006.01)
*C08K 5/43* (2006.01)

(52) U.S. Cl.
CPC .................. *C08K 5/19* (2013.01); *C08K 5/43* (2013.01); *C09J 2301/408* (2020.08); *C09J 2301/502* (2020.08)

(58) Field of Classification Search
CPC ....... C09J 7/10; C09J 9/02; C09J 9/00; C08K 5/19; C08K 5/43; C08K 5/435; C08K 5/44
See application file for complete search history.

(56) References Cited

U.S. PATENT DOCUMENTS

| | | | |
|---|---|---|---|
| 6,620,308 | B2 | 9/2003 | Gilbert |
| 7,208,605 | B2 | 4/2007 | Davis, Jr. |
| 7,208,606 | B2 | 4/2007 | Drent et al. |
| 7,332,218 | B1 | 2/2008 | Gilbert |
| 7,465,492 | B2 | 12/2008 | Gilbert |
| 7,901,812 | B2 | 3/2011 | Michot et al. |
| 7,968,188 | B2 | 6/2011 | Gilbert |
| 8,134,027 | B2 | 3/2012 | Okumura et al. |
| 8,916,267 | B2 | 12/2014 | Bauer et al. |
| 9,202,632 | B2 | 12/2015 | Zhou et al. |
| 2013/0004768 | A1* | 1/2013 | Yamagata .................. C09J 7/38 524/99 |
| 2013/0303669 | A1 | 11/2013 | Morimoto et al. |
| 2014/0158928 | A1 | 6/2014 | Zhou et al. |
| 2014/0248490 | A1 | 9/2014 | Morimoto et al. |
| 2014/0294718 | A1 | 10/2014 | Lee et al. |
| 2015/0105596 | A1 | 4/2015 | Wang et al. |
| 2015/0279577 | A1 | 10/2015 | Uchida et al. |
| 2016/0009962 | A1 | 1/2016 | Yamada et al. |
| 2017/0037285 | A1 | 2/2017 | Choi |
| 2017/0040632 | A1 | 2/2017 | Ogata et al. |
| 2017/0256820 | A1 | 9/2017 | Matsumoto et al. |
| 2017/0355892 | A1 | 12/2017 | Heucher et al. |
| 2020/0002581 | A1 | 1/2020 | Akamatsu et al. |

FOREIGN PATENT DOCUMENTS

| | | |
|---|---|---|
| CN | 103387805 A | 11/2013 |
| CN | 103930508 A | 7/2014 |
| CN | 105295783 A | 2/2016 |
| CN | 106232761 A | 12/2016 |
| CN | 106715389 A | 5/2017 |
| CN | 107207938 A | 9/2017 |
| CN | 110382650 A | 10/2019 |
| EP | 3363875 A1 | 8/2018 |
| JP | 03-179076 A | 8/1991 |
| JP | 2005104845 A | 4/2005 |
| JP | 2006-045475 A | 2/2006 |
| JP | 2010037354 A | 2/2010 |
| JP | 2010037355 A | 2/2010 |
| JP | 2011052056 A | 3/2011 |
| JP | 2012116802 A | 6/2012 |
| JP | 2013-100484 A | 5/2013 |
| JP | 2013-221093 A | 10/2013 |
| JP | 2013249413 A | 12/2013 |
| JP | 2014189671 A | 10/2014 |
| JP | 2016192435 A | 11/2016 |
| JP | 201775289 A | 4/2017 |
| JP | 201795590 A | 6/2017 |
| KR | 101415844 B1 | 7/2014 |
| WO | 2013-029236 A1 | 3/2013 |
| WO | 2013099423 A1 | 7/2013 |
| WO | 2016136924 A1 | 9/2016 |
| WO | 2017064918 | 4/2017 |

OTHER PUBLICATIONS

Atta et al., Synthesis and Application of Poly Ionic Liquid-Based on 2-Acrylamido-2-methyl Propane Sulfonic Acid as Corrosion Protective Film of Steel, International Journal of Electrochemical Science, vol. 10, 6106-6119, 2015.
Gan et al., Methyl Methacrylate Modified Silicone Coats for Metallic Corrosion Protection, J. Wuhan University. (Na. Sci. Ed), vol. 64(1), 46-52, Jan. 2018; contains English abstract.
Leijonmarck, S. et al., Electrochemical Characterization of Electrically Induced Adhesive Debonding, Journal of the Electrochemical Society, 158(10), p. 109-p. 114, bearing an alleged date of Aug. 2011.
Gatty, H.K. et al., Temporary Wafer Bonding and Debonding for 3D Integration Using an Electrochemically Active Polymer Adhesive, ECS Journal of Solid State Science and Technology, 3(5), 115-121, bearing an alleged date of Mar. 2014.
International Search Report and Written Opinion, PCT/US2018/061945, dated Jul. 25, 2019.
Office Action in corresponding Chinese application, 201880086862.7, dated Jun. 3, 2021; English machine translation attached.
Office Action in corresponding Japanese application, 2020-545071, dated Aug. 25, 2021; English machine translation attached.
Wesselbaum et al., Continuous-Flow Hydrogenation of Carbon Dioxide to Pure Formic Acid using an Integrated scCO2 Process with Immobilezed Catalyst and Base, Angew. Chem. Int. Ed., 2012, 51, 8585-8588.
Bi et al., Feature of velocity-cross-correlations in ionic liquids, Journal of Molecular Liquids, 212, 775-784, 2015.

\* cited by examiner

BASIC IONIC LIQUIDS COMPOSITIONS AND ELEMENTS INCLUDING THE SAME

CROSS-REFERENCE

This patent application is a national phase application of PCT/US2018/061945, filed Nov. 20, 2018, which claims the benefit of U.S. Provisional Application No. 62/589,373 filed Nov. 21, 2017, which provisional is incorporated herein by specific reference in its entirety.

BACKGROUND

Field

The present disclosure relates to compounds and/or materials for use as adhesives and coatings for application to surfaces, where the adhesives and coatings may be debonded from the surface without harm to that surface upon the application of an electromotive force. This disclosure also relates to methods for debonding adhesives and coatings from surfaces. More particularly, this disclosure relates to cationic ammonium and anionic fluorosulfonylimide compositions for use in the adhesives and coatings.

Description of Related Art

Ionic compositions, such as ionic liquids, may be useful as adhesives, such as adhesives for metal surfaces. However, it is known that compositions including some imidazolium sulfonylimides can be relatively corrosive to an aluminum surface.

Thus, there is a need for a new ionic composition that can be debonded from a surface without displaying the corrosiveness to metallic substrates.

SUMMARY

In some embodiments, an ionic composition can include: at least one amino-ammonium cation of Formula 1:

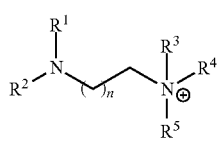

Formula 1 wherein $R^1$, $R^2$, $R^3$, $R^4$ and $R^5$ are independently H, optionally substituted $C_{1-5}$ hydrocarbyl, optionally substituted $C_{1-5}$ hydrocarbyl-OH, or optionally substituted $C_{1-5}$ hydrocarbyl-O—$C_{1-5}$ hydrocarbyl, and wherein n is 1 or 2.

The ionic composition can also include at least one disulfonylimide anion of Formula 2 and/or Formula 3:

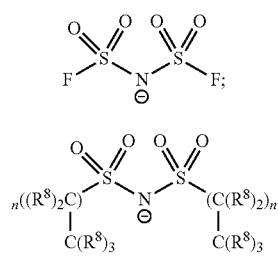

Formula 2

Formula 3 wherein: each $R^8$ is individually a hydrogen or a fluorine; and n is an integer.

Some embodiments include an adhesive composition comprising an ionic composition described herein.

Some embodiments include a structure comprising: 1) a first electro-conductive surface, 2) a second electro-conductive surface, and 3) the adhesive composition described herein disposed between the first electro-conductive surface and the second electro-conductive surface.

Some embodiments include an adhesive member comprising: the adhesive composition described herein formed into an adhesive layer; and at least one release liner on at least one side of the adhesive layer.

Some embodiments include a method of preparing the adhesive composition described herein. The method comprises combining the fluorosulfonylimide anion with the ammonium cation.

Some embodiments include a method of adhering the adhesive composition described herein to a substrate, the method comprising: applying the adhesive composition to a first electrically conductive substrate; and applying the adhesive composition to a second electrically conductive substrate such that the adhesive composition is between the first electrically conductive substrate and the second electrically conductive substrate.

A method of adhering the adhesive layer described herein to first surface. In this method, the release liner is removed from the side of the adhesive layer of the adhesive member to expose a surface of the adhesive layer and adhering the surface of the adhesive layer to the first surface.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
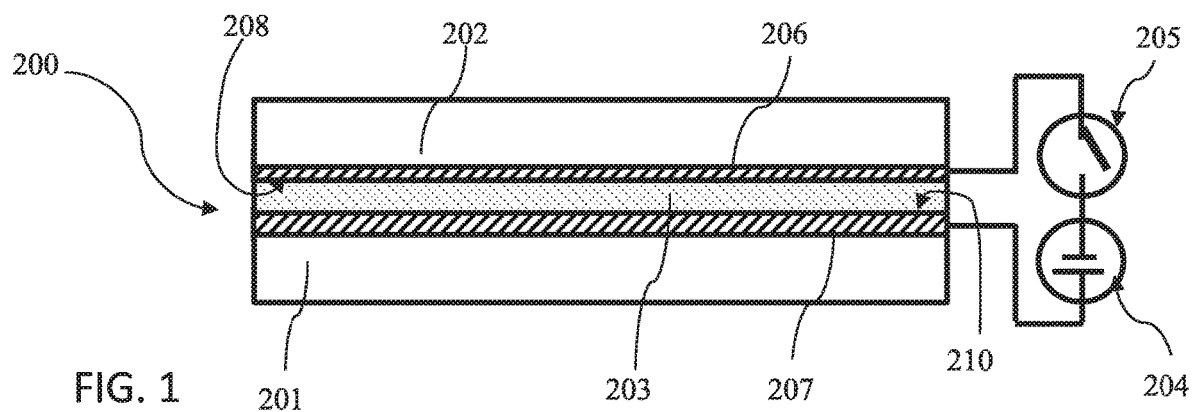
FIG. 1 is a schematic of a device incorporating an embodiment of a compound described herein.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology includes compounds and/or materials for use as adhesives and coatings for application to surfaces, where the adhesives and coatings may be debonded from the surface without harm to that surface upon the application of electromotive force. The present technology also includes methods and systems for debonding adhesives and coatings from substrate surfaces. Additionally, the present technology includes cationic ammonium and anionic sulfonylimide compositions for use in the adhesives and coatings.

In some embodiments, the ionic compositions described herein can be used for bonding to a surface. In some aspects, the ionic compositions can be configured as adhesives or coatings for a surface that when applied bond to the surface, the adhesive or coatings on the surface can be removed therefrom by a debonding procedure. The ionic composition is configured such that after being bonded to the surface, it can be removed without damaging the surface. This can be beneficial to allow for adhesives or coatings to be removed from a surface to retain the surface in pristine condition. The debonding procedure can include applying electricity, such as via an electromotive force, to allow for the adhesive or coating to lift from the surface without damaging the surface.

Additionally, the ionic composition described herein can be configured such that it is substantially less corrosive to metallic substrates than previous ionic compositions. The ionic composition can now be applied to a metallic surface of a substrate without causing the substrate to corrode. This can provide substantial benefit by allowing for more types of surfaces, such as on metallic substrates to receive an ionic composition as an adhesive or coating that are selectively debondable while reducing corrosion compared to prior compositions.

In some embodiments, an ionic composition is described, and the ionic composition comprises a cation and an anion. In some embodiments, the cation can comprise a first aliphatic amine. In some embodiments, the first aliphatic amine can have two substituent groups. In some embodiments the aliphatic amine can comprise an amino group. In some embodiments, the cation can comprise a second aliphatic amine. In some embodiments, the second aliphatic amine can have three substituent groups. In some embodiments, the second aliphatic amine can comprise an ammonium group.

In some embodiments, the cation is described by the following Formula 1:

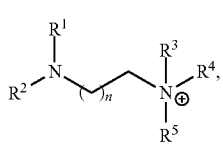

Formula 1 wherein $R^1$, $R^2$, $R^3$, $R^4$ and $R^5$ are independently H, optionally substituted $C_{1-5}$ hydrocarbyl (such as $C_1$ alkyl, $C_2$ alkyl, $C_3$ alkyl, $C_4$ alkyl, $C_5$ alkyl, $C_2$ alkenyl, $C_3$ alkenyl, etc.), optionally substituted $C_{1-5}$ hydrocarbyl-OH (e.g. —$CH_2$—OH, —$C_2H_4$—OH, —$C_3H_4$—OH, etc.) or optionally substituted $C_{1-5}$ hydrocarbyl-O—$C_{1-5}$ hydrocarbyl (e.g. —$C_2H_4$—O—$CH_3$, —$C_2H_4$—O—$C_2H_5$, —$C_3H_6$—O—$C_2H_5$, etc.), and wherein n is 1 or 2. In Formula 1, the cation can be described as both an amino group and an ammonium group. The term "amino" refers to the uncharged chemical group:

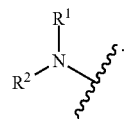

The term "ammonium" refers to the positively charged chemical group:

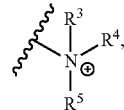

In some embodiments, the anion is a bis(sulfonyl)imide (or sulfonyl imide) described by the following Formula 2:

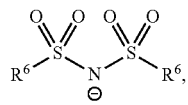

Formula 2 wherein $R^6$ is fluoro (—F), or $C_{1-3}$ fluorohydrocarbyl.

In some embodiments, the anion is a bis(sulfonyl)imide (or sulfonyl imide) described by the following Formula 3:

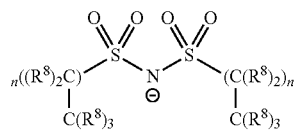

Formula 3 wherein $R^8$ is fluoro (—F), or H, and n is 0, 1, 2, 3, 4, 5, 6, 7, 8, 9, or 10.

In some embodiments, $R^1$, $R^2$, $R^3$, $R^4$ and $R^5$ are independently

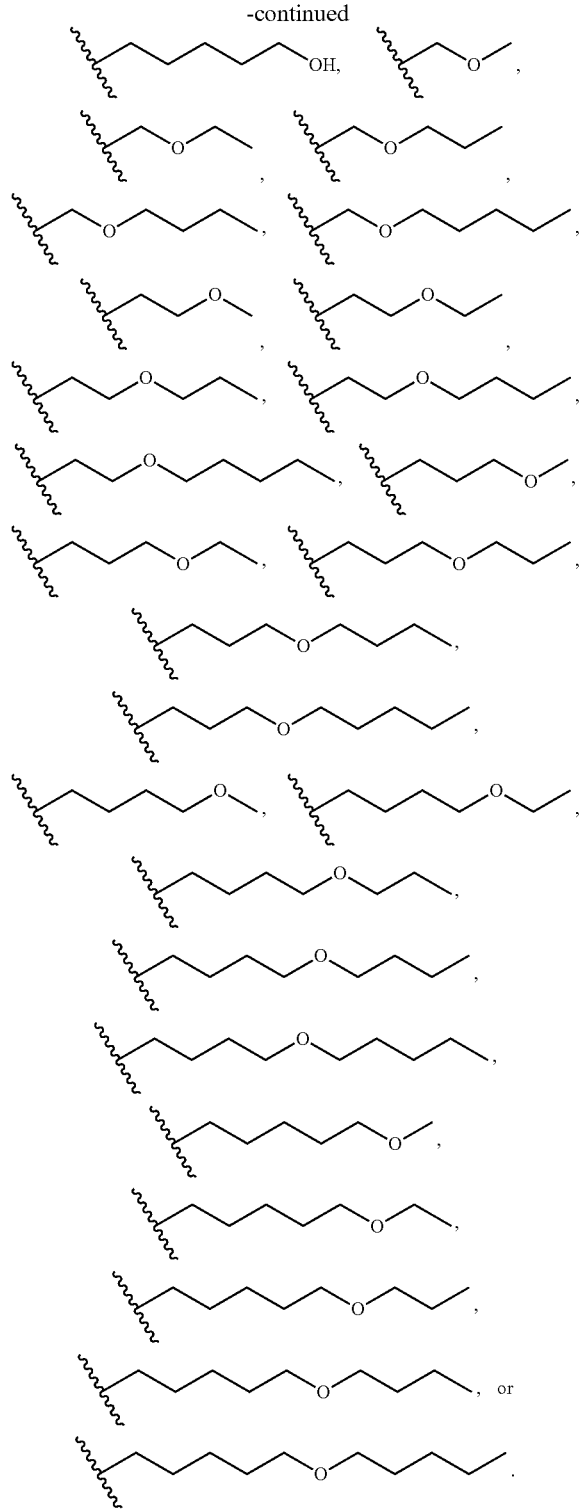

In some embodiments, $R^1$ is methyl. In some embodiments, $R^1$ is ethyl.

In some embodiments, $R^3$ is methyl. In some embodiments, $R^2$ is methyl.

In some embodiments, $R^4$ is methyl. In some embodiments, $R^4$ is ethyl.

In some embodiments, $R^3$ is ethyl. In some embodiments, $R^2$ is ethyl.

In some embodiments, $R^1$, $R^2$, $R^3$, and $R^4$ are methyl. In some embodiments, $R^1$, $R^2$, $R^3$, and $R^4$ are ethyl.

In some embodiments, $R^5$ is methyl, ethyl,

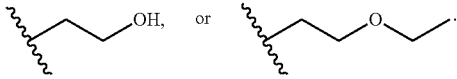

In some embodiments, the ammonium cation is:
Optionally substituted

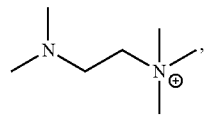

optionally substituted

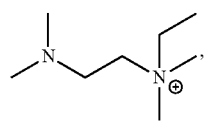

optionally substituted

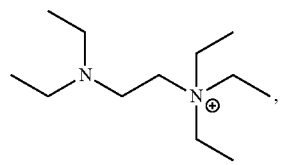

optionally substituted

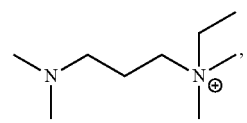

optionally substituted

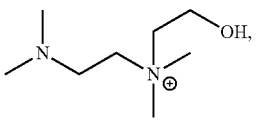

or optionally substituted

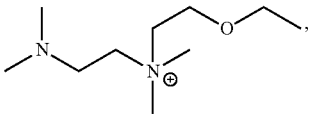

or a combination thereof. Potential substituents for these compounds may be low molecular weight substituents, e.g. having a molecular weight of 15-50 Da, 15-100 Da, or 15-150 Da, such as F, Cl, Br, OH, $NH_2$, or $C_{1-6}H_{0-15}O_{0-2}N_{0-2}S_{0-1}$. In some embodiments, any substituent of these ammonium cations are $C_{1-3}$ alkyl, $C_{1-3}$ O-alkyl, or OH, or any hydrogen on any of the structures above may be replaced with $C_{1-3}$ alkyl, $C_{1-3}$ O-alkyl, or OH.

In some embodiments, the ammonium cation is:

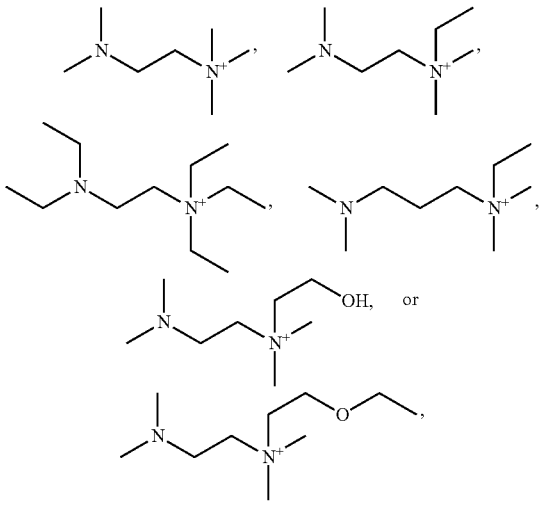

or a combination thereof.

In some embodiments, the bis(sulfonyl)imide (or sulfonyl imide) anion is:

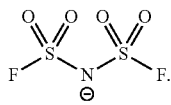

As used herein, optionally substituted refers to a group that may be substituted or unsubstituted. A substituted group is derived from an unsubstituted group in that one or more of the hydrogen atoms of an unsubstituted group are replaced by one or more substituent groups. A substituent group may have one or more substituent groups on the parent group structure. The substituent groups are independently selected from optionally substituted alkyl, —O-hydrocarbyl (e.g. —$OCH_3$, —$OC_2H_5$, —$OC_3H_7$, —$OC_4H_9$, etc.), —S-hydrocarbyl (e.g., —$SCH_3$, —$SC_2H_5$, —$SC_3H_7$, —$SC_4H_9$, etc.), —NR'R", —OH, —SH, —CN, —$NO_2$, or a halogen, wherein R" and R" are independently H or optionally substituted hydrocarbyl. Wherever a substituent is descried as "optionally substituted," that substituent can be substituted with the above substituents.

In some embodiments, the cation can comprise an amino group, a linker and an ammonium group, wherein the amino and ammonium groups are bound to each other by the linker. In some embodiments, the composition can comprise the cation and an anion.

In some embodiments, the anion may be bis(fluorosulfonyl)imide. In some embodiments, the ammonium cation and bis(fluorosulfonyl)imide anion is of the general structure:

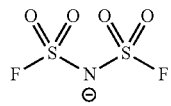

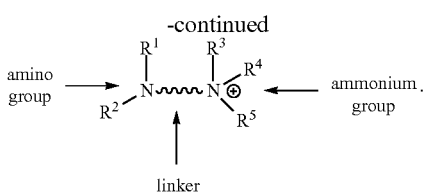

In some embodiments, the ammonium cation is also described as an aminium cation.

In some embodiments, sulfonylimide is also described as sulfonyl imide, sulfonyl amide and/or sulfonylamide.

In this general structure, the amino group can include the R groups as defined herein, such as for example $R^1$, $R^2$, $R^3$, $R^4$, or $R^5$ can be hydrogen or substituents as defined herein.

This general structure may also include the linker, which can be as defined as optionally substituted —$CH_2CH_2$— or optionally substituted —$CH_2CH_2CH_2$—.

In some embodiments, the adhesive composition of one of the embodiments can include a polymer containing the ammonium cation and the fluorosulfonylimide anion. In some aspects, the polymer includes at least one polymer selected from an acrylate polymer, an alkylacrylate polymer, an alkyl-alkylacrylate ester polymer, or a combination thereof. In some aspects, the polymer comprises an acrylate polymer, a methacrylate polymer, or a combination of both acrylate and methacrylate polymers. In some aspects, the polymer comprises acrylic acid, $C_{1-14}$ hydrocarbyl acrylate, $C_{1-14}$ hydrocarbyl methacrylate monomers or a combination thereof. In some aspects, the polymer is crosslinked. In some aspects, the polymer is crosslinked with an epoxy crosslinker. In some aspects, the epoxy crosslinker is N,N,N',N'-tetraglycidyl-m-xylenediamine.

Any suitable amount of ionic liquid may be used in the adhesive composition. In some embodiments, the ionic liquid or ionic compound is about 0.0-1%, about 1-2%, about 2-3%, about 3-4%, about 4-5%, about 5-6%, about 6-7%, about 7-8%, about 8-9%, about 9-10%, about 10-15%, about 15-20%, about 20-25%, about 25-30%, about 30-40%, about 40-50, about 50-100%, about 4.5-5.0%, or about 5% of the total weight of the ionic liquid plus the polymer.

In some embodiments, the ammonium cation and fluorosulfonylimide anion are present in about a 1:1 ratio.

In some embodiments, the adhesive composition is configured to be selectively debondable. In some aspects, the adhesive composition is configured to be selectively debondable under application of an electromotive force.

In some embodiments, a method of preparing the adhesive composition of one of the embodiments can include: combining the fluorosulfonylimide anion with the ammonium cation. In some aspects, the method can include combining the fluorosulfonylimide anion and the ammonium cation with a polymer. In some aspects, the method can include crosslinking the polymer before, during or after being combined with the fluorosulfonylimide anion and the ammonium cation.

In some embodiments, a method of adhering the adhesive composition of one of the embodiments to a substrate can include: applying the adhesive composition to a first electrically conductive substrate. In some aspects, the method can further include applying the adhesive composition to a second electrically conductive substrate such that the adhesive composition is between the first electrically conductive substrate and the second electrically conductive substrate.

In some embodiments, an adhesive member can include: the adhesive composition of one of the embodiments formed into an adhesive layer; and at least one release liner on at least one side of the adhesive layer. In some aspects, the adhesive member can include a release liner on each side of the adhesive layer. The release liner may be removed to expose a side of the adhesive layer so that the adhesive layer can be adhered to another surface.

In some embodiments, a selectively adhesive material can include the adhesive composition of one of the embodiments configured such that application of an electromotive force to the selectively adhesive material reduces the adhesion of the selectively adhesive material.

In some embodiments, a selectively debondable structure can include a selectively debondable layer of the selectively adhesive material of one of the embodiments, wherein the selectively debondable layer is disposed between a first electro-conductive surface and a second electro-conductive surface. In some aspects, the selectively adhesive material adheres to the first electro-conductive surface and the second electro-conductive surface. In some aspects, the selectively debondable structure of one of the embodiments can include a power supply that is in electrical communication with at least one of the first electro-conductive surface and the second electro-conductive surface, creating a closeable electrical circuit therewith. In some aspects, the power supply is a DC power supply, which may provide about 3 volts to about 100 volts. In some aspects, the selectively debondable structure of one of the embodiments, can include the first electro-conductive surface having an electro-conductive material, which can be configured as a substrate. In some aspects, the selectively debondable structure of one of the embodiment can include the second electro-conductive surface having an electro-conductive material, which can be configured as a substrate. In some aspects, the electro-conductive material includes a metal, a mixed metal, an alloy, a metal oxide, a composite metal, a conductive plastic or a conductive polymer. In some aspects, the electro-conductive material includes an electro-conductive metal, a mixed metal, an alloy, a metal oxide, a mixed metal oxide, a conductive plastic, a carbonaceous material, a composite metal, or a conductive polymer. In some aspects, the electro-conductive material includes an electro-conductive metal. In some aspects, the electro-conductive metal includes aluminum. In some aspects, the selectively adhesive material has a reduced corrosive effect upon the first electro-conductive surface and/or second electro-conductive surface.

In some embodiments, a selectively debondable structure can include a selectively debondable layer of the selectively adhesive material of one of the embodiments, wherein the selectively debondable layer is disposed on a first electro-conductive surface. In some aspects, the selectively debondable structure of one of the embodiments can include a power supply that is electrical communication with the first electro-conductive surface.

In some embodiments, a selectively debondable material can include the ionic compositions and/or adhesive compositions of one of the embodiments. In some aspects, the selectively debondable material can include a polymer. In some aspects, the polymer can include an acrylate polymer, a methacrylate polymer, or a combination of both acrylate and methacrylate polymers. In some aspects, the polymer can include acrylic acid, $C_{1-14}$ hydrocarbyl acrylate or $C_{1-14}$ hydrocarbyl methacrylate monomers. In some aspects, the selectively debondable material is an adhesive.

In some embodiments, the ionic composition described herein with the ammonium cation and/or the sulfonylimide anion can be formulated with a polymer. The polymer can be selected based on the functionality thereof in view of the desired functionality. In some aspects, the polymer formulated in the ionic composition can include an acrylic polymer.

In some embodiments, the polymer formulated in the ionic composition, such as with the ammonium cation and/or the sulfonylimide anion can be a polymer suitable for use as the adhesive or coating that is selectively debondable, such as by applying the debonding process to the adhesive or coating. The suitable polymer can include the polymers described in WO2017/064918 and/or JP2017-075289, which are incorporated herein by specific reference in their entirety. In some aspects, the polymer can include a glass transition temperature below 0° C. In some aspects, the polymer can be an acrylic polymer. In some aspects, the acrylic polymer can include a monomer unit derived from a monomer of a formula $R^{a}CH=CHCO_{2}R^{b}$, wherein $R^{a}$ is H or $C_{1-14}$ alkyl (e.g. methyl, ethyl, $C_3$ alkyl, $C_4$ alkyl, $C_5$ alkyl, $C_6$ alkyl, etc.), and $R^{b}$ is H or $C_{1-14}$ alkyl (e.g. methyl, ethyl, $C_3$ alkyl, $C_4$ alkyl, $C_5$ alkyl, $C_6$ alkyl, etc.). In some embodiments, the polymer includes repeating units derived from acrylic acid, methyl acrylate, methacrylic acid, methylmethacrylate, or a combination thereof. In some aspects, the acrylic polymer can contain an alkyl-methacrylate ester and a monomer unit derived from a monomer that contains a polar group. In some aspects, the monomer containing the polar group (e.g., polar monomer) can be a monomer that contains a carboxyl group. In some aspects, the $C_{1-14}$ alkyl group containing alkyl-methacrylate ester is butyl-methacrylate ester, and may be methyl-methacrylate ester, ethyl-methacrylate ester, propyl-methacrylate ester, methyl-ethylacrylate ester, methyl-propylacrylate ester, methyl-butylacrylate ester, or other alkyl-alkylacrylate ester.

In some embodiments, the polymer may be crosslinked. The crosslinked polymer may include the polymer crosslinked with only polymers in the composition. In some aspects, the crosslinked polymer may chemically crosslink with the ammonium cation. In some aspects, the crosslinked polymer may chemically crosslink with the fluorosulfonylimide anion. In some aspects, the crosslinked polymer may chemically crosslink with the ammonium cation and fluorosulfonylimide anion. Crosslinkers that can crosslink the polymers can be selected based on the desired properties in order to provide the crosslinked polymer. The crosslinkers may be suitable for use with the alkyl-alkylacrylate esters. The crosslinker can be an epoxy crosslinker, such as N,N,N',N'-tetraglycidyl-m-xylenediamine. However, it should be recognized that any suitable crosslinker may be used to crosslink the polymer. The crosslinker can be selected to retain the selective adhesive properties and selective debonding properties as described herein. The crosslinker can also be selected to retain the anticorrosive properties described herein.

In some embodiments, a device is described comprising any of the aforementioned compounds. A suitable example of such a device can be as described in JP 2017-075289 and/or WO2017/064925, which is incorporated herein by specific reference in their entirety. Accordingly, the device can be an electronic device that includes an electro-conductive substrate having the selectively adhesive compositions described herein. In some aspects, the device can include a battery.

The ionic composition can be used as a selectively debondable layer on a surface of a substrate, such as the adhesive layer or coating layer as described herein. In some aspects, the ionic composition configured as a selectively debondable layer can be positioned or otherwise located between two electro-conductive surfaces, such as between a first electro-conductive surface and a second electro-conductive surface. The selectively debondable layer formed from the ionic composition can be applied as an adhesive layer (e.g., selectively adhesive) between the first electro-conductive surface and the second electro-conductive surface, so as to adhere a first substrate having the first electro-conductive surface to a second substrate having the second electro-conductive surface. The adhesive layer may be considered to be selectively adhesive due to the debonding procedure that can be implemented to debond the adhesive layer from the first electro-conductive surface and/or the second electro-conductive surface. The debonding procedure can include applying electricity, such as via an electromotive force, to the first electro-conductive substrate and/or the second electro-conductive substrate to debond the adhesive layer therefrom. The debonding procedure can cause a reduction of adhesiveness in the adhesive layer so as to be less adhesive to the first electro-conductive surface and/or the second electro-conductive surface, which allows separating the adhesive layer therefrom. This also allows for the first electro-conductive surface to be separated from the second electro-conductive surface. Due to the ionic composition being less corrosive and the debonding procedure allowing for removal from the surfaces without damage, the surfaces can be retained in significantly improved conditions compared to prior adhesives. The improved condition can be beneficial for reuse of the substrates having the surfaces.

In some embodiments, the ionic composition can be configured to have reduced corrosion or no corrosion (e.g., unmeasurable or undetectable) for metal substrates, such as electro-conductive metal substrates.

In some embodiments, the ionic composition can be provided with the ingredients as described herein. In some aspects, the ionic composition having a reduced Lewis acidity. In some aspects, the ionic composition can include a suitable pH. In some aspects, the ionic composition can include a pH that is not overly acidic or overly basic. In some examples, the pH can range from about 5 to about 9, or about 6 to about 8 or about 7. When alkaline, the pH can range from about 7 to about 9, about 7.5 to about 8.5, or about 8.

The selectively debondable layer can be used in a selectively debondable structure that used to adhere two non-conductive materials to one another, and then release the bonding so that the debonded materials do not contain any conductive materials or layers. This type of structure comprises an electro-conductive layer with a selectively debondable layer adhered to each side. Each of these adhesive layers can then be adhered to a nonconductive material, thus providing adhesion between two nonconductive structures. An electromotive force can then be applied to the electro-conductive layer to reduce the adhesion in both adhesive layers. Thus, the two nonconductive structures can be adhered to one another, and then separated, without needing to first be bonded or attached to a conductive layer or material.

In some embodiments, the ionic composition can be provided with various ratios of the ammonium cation with respect to the sulfonylimide anion. In some aspects, the molar ratios of the ammonium cation:sulfonylimide anion can be 1:10, 1:9, 1:8. 1:7, 1:6, 1:5, 1:4, 1:3, 1:2, 1:1, 2:1, 3:1, 4:1, 5:1, 6:1, 7:1, 8:1, 9:1, 10:1, 1:10-1:9, 1:9-1:8. 1:8-1:7, 1:7-1:6, 1:6-1:5, 1:5-1:4, 1:4-1:3, 1:3-1:2, 1:2-1:1, 1:1-2:1, 2:1-3:1, 3:1-4:1, 4:1-5:1, 5:1-6:1, 6:1-7:1, 7:1-8:1, 8:1-9:1, or 9:1-10:1. In one aspect, the ratio of the ammonium cation:sulfonylimide anion can be 1:1, or substantially equivalent, such as being 0.1%, 0.5%, 0.75%, 1%, 2%, or 5% from being equivalent.

In some embodiments, the ionic composition can be provided so that the molecular weight is reduced. For example, the molecular weight may be less than 160 g/mole. This molecular weight can be for a substance formed from the ammonium cation and/or sulfonylimide anion.

Figure 2:
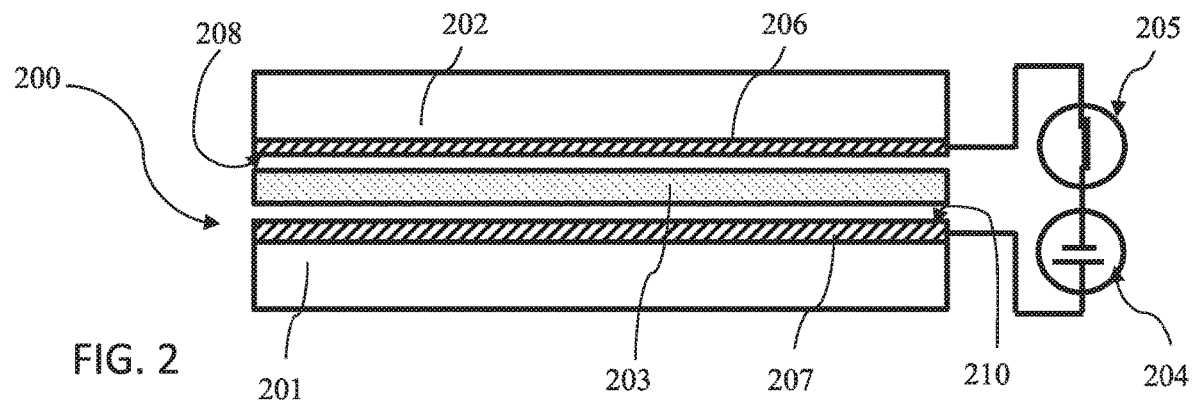
FIG. 2 is a schematic of a device incorporating an embodiment of a compound described herein.

FIGS. 1 and 2 show a device 200 having a first electro-conductive substrate 206 having a first electro-conductive surface 208 and a second electro-conductive substrate 207 having a second electro-conductive surface 210. FIG. 1 shows a first stage with bonding where the selectively adhesive material 203 is positioned between and in contact (e.g., bonded) with the first electro-conductive surface 208 and the second electro-conductive surface 210. Accordingly, when bonded the first electro-conductive surface 208 is adhered to a first side of the selectively adhesive material 203 and the second electro-conductive surface 210 is adhered to a second side of the selectively adhesive material 203.

FIG. 2 shows a second stage with debonding where the selectively adhesive material 203 is positioned between and not in contact (e.g., debonded) with the first electro-conductive surface 208 and second electro-conductive surface 210. Accordingly, when bonded the first electro-conductive surface 208 is debonded from the first side of the selectively adhesive material 203 and the second electro-conductive surface 210 is debonded from the second side of the selectively adhesive material 203.

As shown in FIGS. 1 and 2, the selectively adhesive material 203 is configured as a selectively debondable layer that is disposed between the first electro-conductive surface 208 and the second electro-conductive surface 210.

The selectively adhesive material 203 can include the compounds of the ionic compositions described herein. As such, the selectively adhesive material 203 can be a selectively debondable layer or coating disposed between the first electro-conductive substrate 206 and the second electro-conductive substrate 207. The first electro-conductive substrate 206 having an electro-conductive surface 208 and the second electro-conductive substrate 207 having an electro-conductive surface 210, can respectively be each individually disposed upon two non-metal (non-electro-conductive) substrates or layers, 201 and 202.

The first electro-conductive substrate 206 and second electro-conductive substrate 207 may be in electrical communication with a power supply 204 (e.g., DC, but may be AC) to complete a closeable electrical circuit with an intervening switch 205, or may be attached to the power supply when debonding is desired. When the switch 205 is open, as shown in FIG. 1 there is no electromotive force so that the selectively adhesive material 203 is bonded to both the first electro-conductive surface 208 and the second electro-conductive surface 210, which can be metal coating-adhesive interfaces. When the switch 205 is closed, as shown in FIG. 2 an electromotive force is created wherein, the two substrates or layers 201 and 202 can separate from the selectively adhesive material 203, thereby the selectively adhesive material 203 is separated from both the first electro-conductive surface 208 and the second electro-conductive surface 210. The DC voltage can typically be from about 3V to about 100 V, but may be varied as needed or desired.

In some embodiments, the selectively adhesive material 203 can also be referred to as a selectively debondable layer due to the ability to have selective bonding without an electrical current or selective debonding with an electrical current. The material 203 can comprise a selectively adhesive material, which can be formed from the ionic compositions described herein. In some aspects, the material 203 can bind and connect the first electro-conductive surface 208 and the second electro-conductive surface 210 together, wherein the application of an electromotive force to the electro-conductive materials of the first electro-conductive substrate 206 or second electro-conductive substrate 207 reduces the adhesion of the material 203. In some aspects, the material 203 can include an ionic composition having a compound of at least Formula 1. In some embodiments, the material 203 can include an ionic composition having a compound of Formula 1 and a compound of Formula 2. In some instances, the ionic composition can include a compound of Formula 3 in place of the compound of Formula 2 or in addition thereto. As such, the ionic composition can include a cation of at least one of Formula 1, with or without an anion of at least one of Formula 2 or Formula 3.

While not wanting to be bound by theory, it is believed that a movement of ions within the material 203 formed by the ionic composition may be effected by application of the electrical potential thereto. Upon a sufficient amount of movement being effected, such as sufficient ionic components being adjacent to the electro-conductive surface (e.g., 208 and/or 210), the adhesive qualities of the material 203 formed from the ionic composition is reduced, enabling separation of one or both of the electro-conductive surfaces 208, 210 from the material 203.

The selectively adhesive material 203 (e.g., also selectively debondable layer) incorporating the compounds of Formula 1, with or without an anion of at least one of Formula 2 and/or Formula 3, can be a selectively debondable layer or coating disposed between the first electro-conductive substrate 206 and second electro-conductive substrate 207.

The first electro-conductive substrate 206 and second electro-conductive substrate 207 can be any electrically conductive material, such as a metal. An example of an electro-conductive metal that can be used for a first electro-conductive substrate 206 and second electro-conductive substrate 207 is aluminum. The electro-conductive material may include a conventional material such as a metal, mixed metal, alloy, metal oxide, mixed-metal oxide, a conductive polymer, a conductive plastic, or a conductive carbonaceous material. Examples of suitable metals include the Group 1 metals and Groups 4-15 metals. Examples of suitable metals, include but are not limited to, include stainless steel, Al, Ag, Mg, Ca, Cu, Mg/Ag, LiF/Al, CsF, CsF/Al and/or alloys thereof. In some embodiments, the electro-conductive layers (e.g., first electro-conductive substrate 206 and second electro-conductive substrate 207) and/or the adhesive layer can each have a thickness in the range of about 1 nm to about 1000 µm, or 1 nm to about 100 µm, or 1 nm to about 10 µm, or 1 nm to about 1 µm, or 1 nm to about 0.1 µm, or 10 nm to about 1000 µm, or 100 nm to about 1000 µm, or 1 µm to about 1000 µm, or 10 µm to about 1000 µm, or 100 µm to about 1000 µm. In some aspects, the thickness can be from 20 nm to about 200 µm, or 100 nm to about 100 µm, or 200 nm to about 500 µm.

The two non-electro-conductive substrates or layers 201 and 202 can be any non-conducting material. Some examples can include non-conducting wood, cardboard, fiberglass density fiberboard, or plastic, as well as any other non-conducting material. In some aspects, the layers 201 and 202 can be electrical insulators. In some aspects, the layers 201 and 202 may be semiconductors. Any of the non-electro-conductive substrates 201 or 202 or semiconductor substrate (e.g., printed circuit board, PCB) can have any thickness and may be coupled to other substrates, materials or devices.

In some embodiments, the ionic composition, whether configured as an adhesive or a coating, of the selectively adhesive material 203 can have a reduced corrosive effect on the electro-conductive layers of the first electro-conductive substrate 206 or second electro-conductive substrate 207. The reduced corrosive effect can be comparable to the corrosive effect of other ionic compositions. Suitable protocols to assess the corrosive effect of the material 203 on the electro-conductive materials can include the procedures described in ASTM G69-12 (Standard Test Method for Measurement of Corrosion Potentials of Aluminum Alloys), which is incorporated herein by specific reference. Suitable alternative protocols to assess the corrosive effect of the ionic composition material 203 upon the electro-conductive materials of the first electro-conductive substrate 206 or second electro-conductive substrate 207 can be achieved by visually examining interface between the material 203 (e.g., adhesive) and the electro-conductive substrate (e.g., aluminum foil) for any indication of corrosive degradation of the substrate and/or dissolution of the material from the electro-conductive substrate (e.g., metal) into the material 203 and/or pitting of the surface of the electro-conductive substrate. If corrosiveness was observed, the time was recorded, and the sample was indicated as corrosive, as shown in Table 1 below.

In some embodiments, the selectively adhesive material can be chemically stable with an electrically conductive electrode or electro-conductive materials. That is, the selectively adhesive material can avoid chemical degradation when applied to an electrically conductive electrode or electro-conductive materials, whether in the bonding stage with no electrical current, or in the debonding stage with electrical current. As such, the selectively adhesive material can be considered to have chemical stability during use. The stability of the selectively adhesive material can be maintained when located on aluminum, stainless steel, and/or combinations and/or mixtures thereof. In some aspects, the chemical stability of the selectively adhesive material is defined as lack of (or minimal presence) of undesired reactions between the electrically conductive material and the selectively adhesive material. Undesired reactions may include, for example, corrosive degradation of the electrically conductive material, dissolution of the electrically conductive material into the selectively adhesive material and/or pitting of the electrically conductive material.

In some embodiments, the presently described ionic composition formed as the selectively adhesive material when deposited on or in contact with the electro-conductive material may result in reduced or absence of corrosive degradation thereof. In some embodiments, direct contact of the neat ionic compound (e.g., ammonium cation and/or sulfonylimide anion) or ionic composition or the selectively adhesive material formed from the ionic composition on the electro-conductive material may show an absence or minimize any corrosive degradation thereof for a period of at least or greater than 15 minutes, 30 minutes, 1 hour, 3 hours, 5 hours, 7 hours, 24 hours, 50 hours, 100 hours 125 hours, 200 hours, and/or 300 hours. In some aspects, direct contact of the neat ionic compound or ionic composition or selectively adhesive material on the electro-conductive material may minimize and/or prevent corrosive degradation thereof for one of the time periods described above. In some aspects, direct contact of the neat ionic compound or ionic composition or selectively adhesive material upon electro-conductive material may minimize and/or prevent corrosive degradation thereof for periods described above in a 60° C./90% relative humidity (RH), 85° C./85% RH, or 90° C./80% RH environment, or any range therebetween for humidity and/or for temperature. In some aspects, a suitable protocol to exemplify an absence of any corrosive degradation can be by demonstrating a lack of total penetration into a surface of the electro-conductive material. In an example, the electro-conductive material can be about 50 nm thick electro-conductive sheet of aluminum foil and the corrosive test can be performed for the above described time periods and/or environmental conditions.

In some embodiments, the selectively adhesive materials formed from the ionic compositions described herein can be formulated to minimize corrosion of the above described electro-conductive substrates under conditions of prolonged high humidity and high temperature. In particular, the adhesive composition is capable of maintaining two such electro-conductive substrates in fixed relation to each other during and after being subjected to aging. This resistance to corrosion has been validated by Accelerated Aging Test Method II, described herein, which can include exposure to 90° C./80% RH for a period of time described herein. The selectively adhesive materials can be fabricated using techniques known in the art, as informed by the guidance provided herein.

EXAMPLES

It has been discovered that embodiments of ionic compositions and elements described herein reduce the deterioration and/or corrosion of the conductive metal layers described herein. These benefits are further shown by the following examples, which are intended to be illustrative of the embodiments of the disclosure, but are not intended to limit the scope or underlying principles in any way.

Synthesis of Ionic Compositions

Example 1

2-(Dimethylamino)-N,N,N-trimethylethan-1-aminium bis(fluorosulfonyl)amide

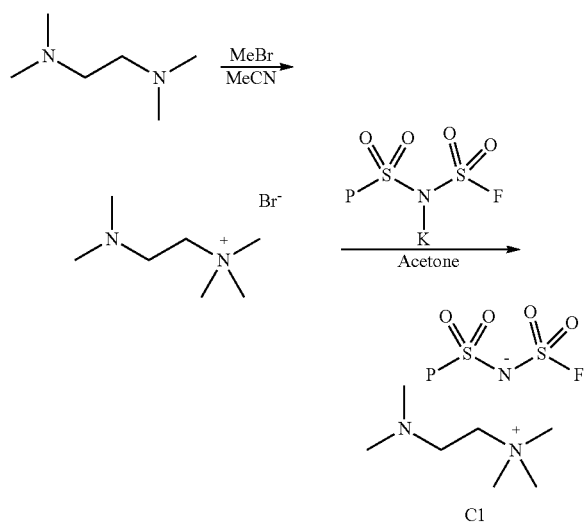

A solution of N,N,N',N'-tetramethyl-1,2-ethylenediamine (19.44 g, 167 mmol) in dry acetonitrile (75 mL) was placed in a pressure reactor cooled in an ice-water bath. Methyl bromide gas (10.00 g, 105 mmol) was slowly bubbled in, the reactor was sealed and kept at room temperature. White precipitate started to form within a few minutes. After two hours, the reaction mixture was diluted with ethyl ether (200 mL) causing formation of dense precipitate. The mixture was stirred for 15 min. The solid was filtered off, washed with ethyl ether and dried in a vacuum oven to give 2-(dimethylamino)-N,N,N-trimethylethan-1-aminium bromide (20.77 g. 94% yield).

A mixture of 2-(dimethylamino)-N,N,N-trimethylethan-1-aminium bromide (9.54 g. 45.2 mmol), bis(fluorosulfonyl)imide potassium salt [KFSI] (9.90 g, 45.2 mmol) and dry acetone (60 mL) was stirred under argon at 50° C. for 4 h. The mixture was then set aside at room temperature overnight. The solid was filtered off, and the solvent was removed under reduced pressure to give an oily substance. A small amount of a solid material separated on the flask bottom upon storage overnight at room temperature. The liquid was separated by decantation. The NMR spectra proved it to be pure 2-(dimethylamino)-N,N,N-trimethyl-ethan-1-aminium bis(fluorosulfonyl)amide (12.96 g, 92% yield). $^1$H NMR (d$_6$-DMSO) δ: 3.41 (t, J=6.2 Hz, 2H), 3.10 (s, 9H), 2.63 (m, 2H), 2.20 (s, 6H).

Example 2

2-(Dimethylamino)-N-ethyl-N,N-dimethylethan-1-aminium bis(fluorosulfonyl)amide

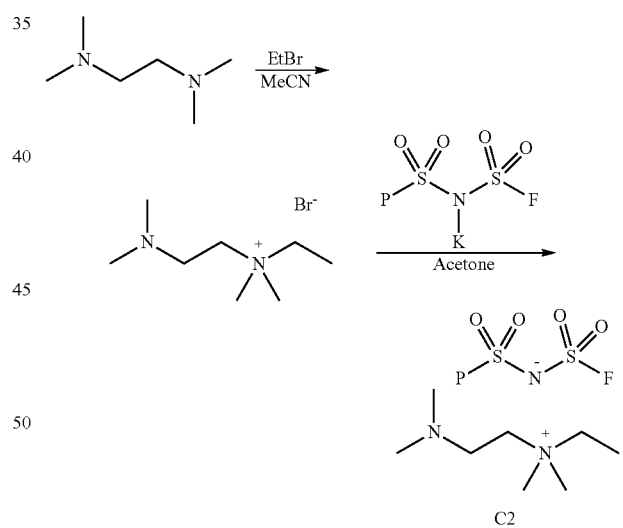

A solution of N,N,N',N'-tetramethyl-1,2-ethylenediamine (15 mL, 100 mmol) in dry acetonitrile (75 mL) was placed in a pressure reactor. Ethyl bromide (3.7 mL, 50 mmol) was added, the reactor was sealed and heated at 60° C. for 16 h. The volatiles were removed under reduced pressure. Trituration of the residue with ethyl ether (200 mL) produced dense precipitate. The solid was filtered off, washed with ethyl ether and dried in a vacuum oven to give 2-(dimethylamino)-N-ethyl-N,N-dimethylethan-1-aminium bromide (10.58 g. 94% yield).

A mixture of 2-(dimethylamino)-N-ethyl-N,N-dimethyl-ethan-1-aminium bromide (8.02 g. 35.6 mmol), KFSI (7.80 g, 35.6 mmol) and dry acetone (100 mL) was stirred under argon at 60° C. for 2 h. After cooling to room temperature, the solid was filtered off, and the solvent was removed under reduced pressure to give an oily substance. A solution of the crude product in ethyl acetate (200 mL) was washed with water (100 mL), dried over sodium sulfate and concentrated under reduced pressure to give pure 2-(dimethylamino)-N-ethyl-N,N-dimethylethan-1-aminium bis(fluorosulfonyl)amide (9.60 g, 88% yield). $^1$H NMR (d$_6$-DMSO) δ: 3.38 (q, J=7.2 Hz, 2H), 3.35 (t, J=6.2 Hz, 2H), 3.03 (s, 6H), 2.62 (t, J=6.2 Hz, 2H), 2.20 (s, 6H), 1.24 (t, J=7.2 Hz, 3H).

Example 3

2-(Diethylamino)-N,N,N-triethylethan-1-aminium bis(fluorosulfonyl)amide

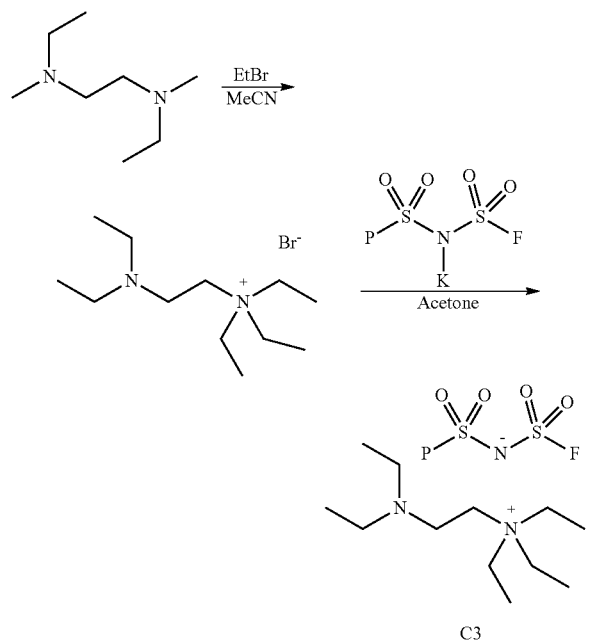

A solution of N,N,N',N'-tetraethylethane-1,2-diamine (10.1 g, 58.6 mmol) in dry acetonitrile (65 mL) was placed in a pressure reactor. Ethyl bromide (4.79 g, 43.96 mmol) was added, the reactor was sealed and heated at 60° C. for 16 h. The volatiles were removed under reduced pressure. Trituration of the residue with ethyl ether (75 mL) made the crude product slowly recrystallized. The white crystals were filtered off, washed with ethyl ether (100 mL) and dried in a vacuum oven for 2 hours at room temperature to give 2-(diethylamino)-N,N,N-triethylethan-1-aminium bromide (11.22 g. 68% yield).

A mixture of 2-(diethylamino)-N,N,N-triethylethan-1-aminium bromide (5.61 g. 19.9 mmol), KFSI (4.37 g, 19.9 mmol) and dry acetone (100 mL) was stirred under argon at 50° C. for 2 h. After cooling to room temperature, the solid was filtered off, and the solvent was removed under reduced pressure to give a crude product. Dichloromethane (75 mL) was added onto the crude product and let it sit overnight. The fine white precipitates were filtered and the filtrate was concentrated under reduced pressure to give pure 2-(diethylamino)-N,N,N-triethylethan-1-aminium bis(fluorosulfonyl)amide (7.14 g, 94% yield). $^1$H NMR (400 MHz, DMSO-d$_6$) δ 3.29 (q, J=7.2 Hz, 6H), 3.23 (t, J=6.9 Hz, 2H), 2.68 (t, J=6.8 Hz, 2H), 2.58-2.44 (m, 4H), 1.19 (t, 9H), 0.98 (t, J=7.1 Hz, 6H).

Example 4

3-(Dimethylamino)-N-ethyl-N,N-dimethylpropan-1-aminium bis(fluorosulfonyl)amide

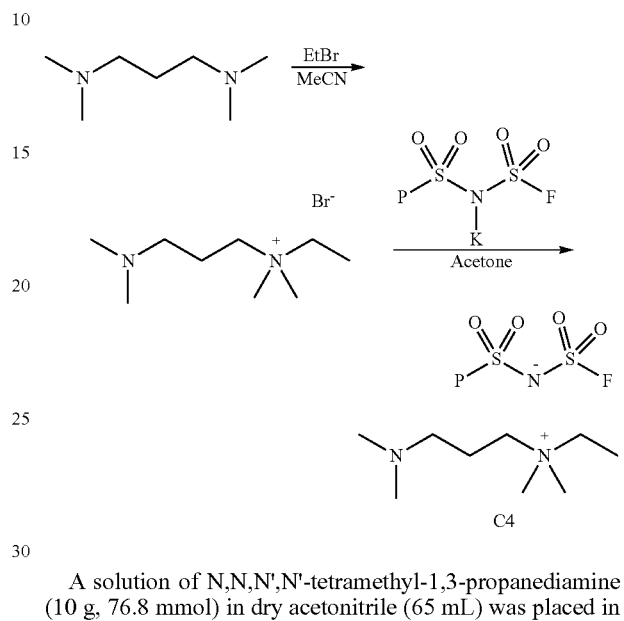

A solution of N,N,N',N'-tetramethyl-1,3-propanediamine (10 g, 76.8 mmol) in dry acetonitrile (65 mL) was placed in a pressure reactor. Ethyl bromide (5.58 g, 51.2 mmol) was added, the reactor was sealed and heated at 60° C. for 16 h. The volatiles were removed under reduced pressure. Trituration of the residue with ethyl ether (75 mL) was performed to recrystallize the crude product. The white precipitates were filtered off, washed with ethyl ether and dried in a vacuum oven for 3 hours at room temperature to give 3-(dimethylamino)-N-ethyl-N,N-dimethylpropan-1-aminium bromide (11.06 g. 60% yield).

A mixture of 3-(dimethylamino)-N-ethyl-N,N-dimethylpropan-1-aminium bromide (5.50 g. 23.0 mmol), KFSI (4.37 g, 23.0 mmol) and dry acetone (100 mL) was stirred under argon at 50° C. for 2 h. After cooling to room temperature, the solid was filtered off, and the solvent was removed under reduced pressure to give a crude product. Dichloromethane (75 mL) was added onto the crude product and let it sit overnight. The white precipitates were filtered and the filtrate was concentrated under reduced pressure to give pure 3-(dimethylamino)-N-ethyl-N,N-dimethylpropan-1-aminium bis(fluorosulfonyl)amide (7.12 g, 91% yield). $^1$H NMR (400 MHz, DMSO-d$_6$) δ 3.33 (q, 2H), 3.29-3.20 (m, 2H), 2.98 (s, 6H), 2.26 (t, J=6.6 Hz, 2H), 2.14 (s, 6H), 1.85-1.73 (m, 2H), 1.27-1.19 (m, 3H).

Example 5

2-(Dimethylamino)-N-(2-hydroxyethyl)-N,N-dimethylethan-1-aminium bis(fluorosulfonyl)amide

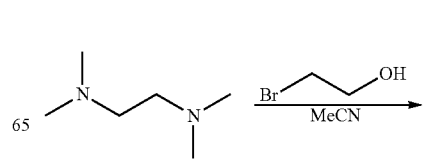

-continued

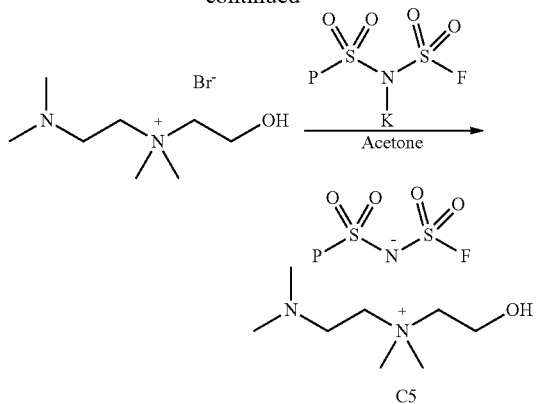

C5

A mixture of N,N,N',N'-tetramethyl-1,2-ethylenediamine (15.0 mL, 100 mmol), 2-bromoethanol (7.1 mL, 100 mmol) and acetonitrile (30 mL) was stirred under argon and heated at 60° C. for 3 h. After setting overnight at room temperature, the solid was filtered off, and the solvent was removed under reduced pressure. The remaining oil was washed with ethyl ether (2×100 mL) and dried in a vacuum oven at 40° C. to give solid 2-(dimethylamino)-N-(2-hydroxyethyl)-N,N-dimethylethan-1-aminium bromide (13.50 g, 56% yield).

A mixture of 2-(dimethylamino)-N-(2-hydroxyethyl)-N,N-dimethylethan-1-aminium bromide (7.23 g, 30 mmol), KFSI (6.58 g, 30 mmol) and dry acetone (50 mL) was stirred under argon at 50° C. for 3 h. After storage overnight at room temperature, the solid was filtered off, and the solvent was removed under reduced pressure. The residue was kept at room temperature overnight to give a little solid deposition on the flask bottom. The oily substance was separated by decantation as 2-(dimethylamino)-N-(2-hydroxyethyl)-N,N-dimethylethan-1-aminium bis(fluorosulfonyl)amide (9.58 g, 93% yield). $^1$H NMR (d$_6$-DMSO) δ: 3.83 (m, 2H), 3.44 (m, 4H), 3.11 (s, 6H), 2.66 (m, 2H), 2.21 (s, 6H).

Example 6

2-(Dimethylamino)-N-(2-ethoxyethyl)-N,N-dimethylethan-1-aminium bis(fluorosulfonyl)amide

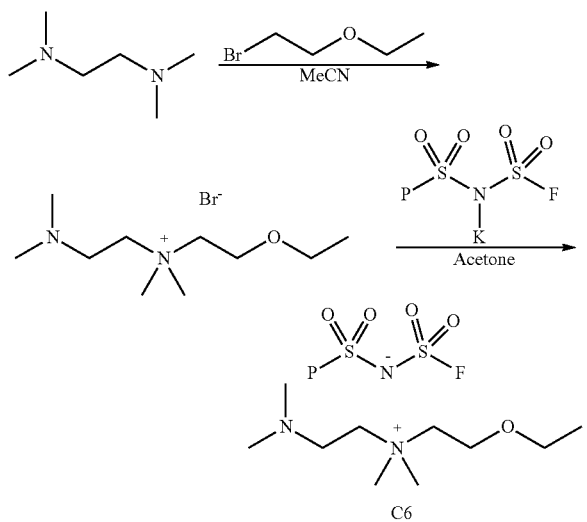

C6

A mixture of N,N,N',N'-tetramethyl-1,2-ethylenediamine (15.0 mL, 100 mmol), 2-bromoethyl ethyl ether (11.3 mL, 100 mmol) and acetonitrile (30 mL) was stirred under argon and heated at 60° C. for 3 h. The solvent was evaporated under reduce pressure. The residue was washed with ethyl ether and dried in a vacuum oven at 50° C. The crude product was suspended in dry acetone (100 mL) and stirred for 2 h. The solid was filtered off and dried in a vacuum oven to give 2-(dimethylamino)-N-(2-ethoxyethyl)-N,N-dimethylethan-1-aminium bromide containing 6% of acetone (32.11 g, 82% yield). The product was used in the next step without further drying.

A mixture of 2-(dimethylamino)-N-(2-ethoxyethyl)-N,N-dimethylethan-1-aminium bromide containing 6% of acetone (9.49 g, 33 mmol). KFSI (7.23 g, 33 mmol) and dry acetone (50 mL) was stirred under argon at 50° C. for 3 h. After cooling to room temperature, the solid was filtered off, and the solvent was removed under reduced pressure to give 2-(dimethylamino)-N-(2-ethoxyethyl)-N,N-dimethylethan-1-aminium bis(fluorosulfonyl)amide (10.26 g, 84% yield). $^1$H NMR (d$_6$-DMSO) δ: 3.78 (m, 2H), 3.56 (t, J=5.0 Hz, 2H), 3.48 (q, J=7.0 Hz, 2H), 3.46 (m, 2H), 3.10 (s, 6H), 2.66 (m, 2H), 2.21 (s, 6H), 1.14 (t, J=7.0 Hz, 3H).

Preparation of Polymer Solution 95 mass parts n-butyl acrylate, 5 mass parts acrylic acid and 125 mass parts ethyl acetate were introduced into a stirring flask attached to a condenser that was equipped with a nitrogen gas inlet. The mixture was stirred at room temperature while introducing the nitrogen gas, for about 1 hour to remove oxygen from the reaction system. 0.2 mass parts azobisisobutyronitrile (AIBN) were added, which increased the temperature of the resulting mixture to about 63°±2° C., and mixed/stirred for about 5-6 hours for polymerization. After stopping the reaction, an acrylic polymer-containing solution resulted, having a solid content of about 30%. The apparent molecular weight of the polymer solution (P1) was determined to be about 800,000 with a Tg (glass transition temperature) of about −50° C.

Preparation of Adhesive Sheet

An adhesive sheet was prepared by mixing the polymer solution described above with 0.01 gm of an epoxy cross-linking agent, such as N,N,N',N'-tetraglycidyl-m-xylenediamine, per 100 gm of solid polymer solution and one of the ionic liquid compound (e.g., 5.0 wt % of the solid polymer), described above, to obtain an electrically debondable adhesive compositions. The prepared compositions were coated/deposited upon a surface treated PET separator (release liner) [MRF38, made by Mitsubishi Chemical Corp., Japan], forming an adhesive composite layer at a thickness of about 150 μm (microns). The coated film was then heat dried at 130° C. for about 3 minutes. A second PET separator (release liner) was then aligned over the exposed adhesive coating to obtain a layered sheet (PET separator/adhesive coating/PET separator) which was then aged/dried at 50° C. for about 20-24 hours and then stored under ambient conditions until needed.

Adhesive Ionic Composition Corrosive Test

Just prior to the application of the adhesive sheet to the nano-Al coated layer, the aforementioned release liner was removed. The adhesive sheet, as previously described above was applied to the metallic surface of the aluminum film (50 nm-thick aluminum coated PET film [Toray Advanced Film, Tokyo, Japan]).

The prepared film was placed in a Temperature & Humidity Benchtop chamber, set at 60° C./85% Relative Humidity (RH), 85° C./85% RH or 80° C./90% RH (ESPEC North America, [Hudsonville, Mich., USA], Criterion Temperature & Humidity Benchtop Model BTL-433) and were periodically checked at selected times (initially hourly). The interface between the adhesive and the aluminum foil was visually examined for an indication of corrosive degradation of the aluminum foil and/or dissolution of the metal in the selectively adherent adhesive and/or pitting of the aluminum foil. If corrosiveness was observed, the time was recorded and the sample was indicated as corrosive. The results are shown in Table 1, below.

TABLE 1

| No IL | AS-110 | C1 | C2 | C3 | C4 | C5 | C6 |
|---|---|---|---|---|---|---|---|
| >600 h | <3 h | >320 h | <150 h | <630 h | <150 h | <60 h | >230 h |

Adhesion Test

Figure 3:
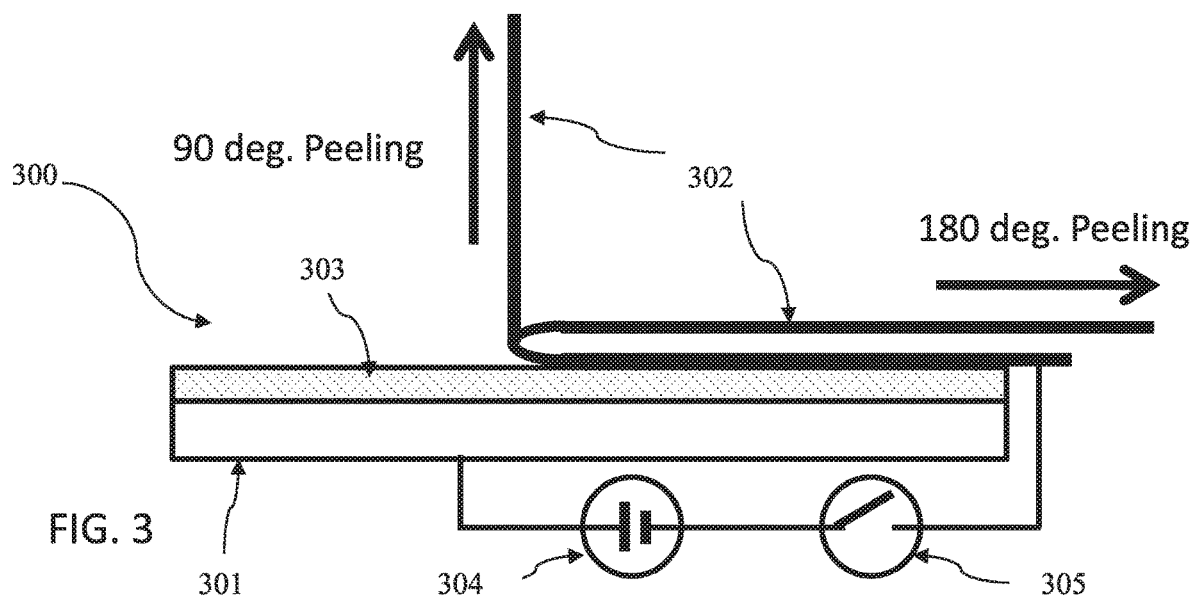
FIG. 3 is a schematic of a device used in testing the adhesion quality of the embodiments of compounds described herein.

The testing for adhesion was done in the manner as described in Japanese Patent Publication No. JP 2017-095590 and/or WO2017/064918 and shown in FIG. 3.

As shown in FIG. 3, the adhesive material 303 was coated upon a conductive substrate 301 of 25 mm wide and 100 mm long and laminated upon another flexible conductive layer 302 (such as aluminum foil and/or metalized plastic film such as PET), which is 10 mm to 25 mm wide and 100 mm longer than 301 and by the application of rolling pressure, by 2 kg roller and roll press.

The bonding/de-bonding tester (Mark-10, Copiague, N.Y., USA, model ESM303 motorized tension/compression stand) was equipped with a Mark-10 force gauge (Series 7-1000) and had lower and upper clamps. The conductive substrate 301 in FIG. 2, as described in Example 2, was fixed onto the lower clamp and then electrically connected to the positive pole of a power supply 304 (Protek DC Power Supply 3006B). The top layer 302 in FIG. 2 was fixed to the upper clamp which is connected with the negative pole of the same DC power supply. The power supply had an output range from 0 to 100 VDC. The moving/peeling speed was set at 300 mm/min.

Figure 4:
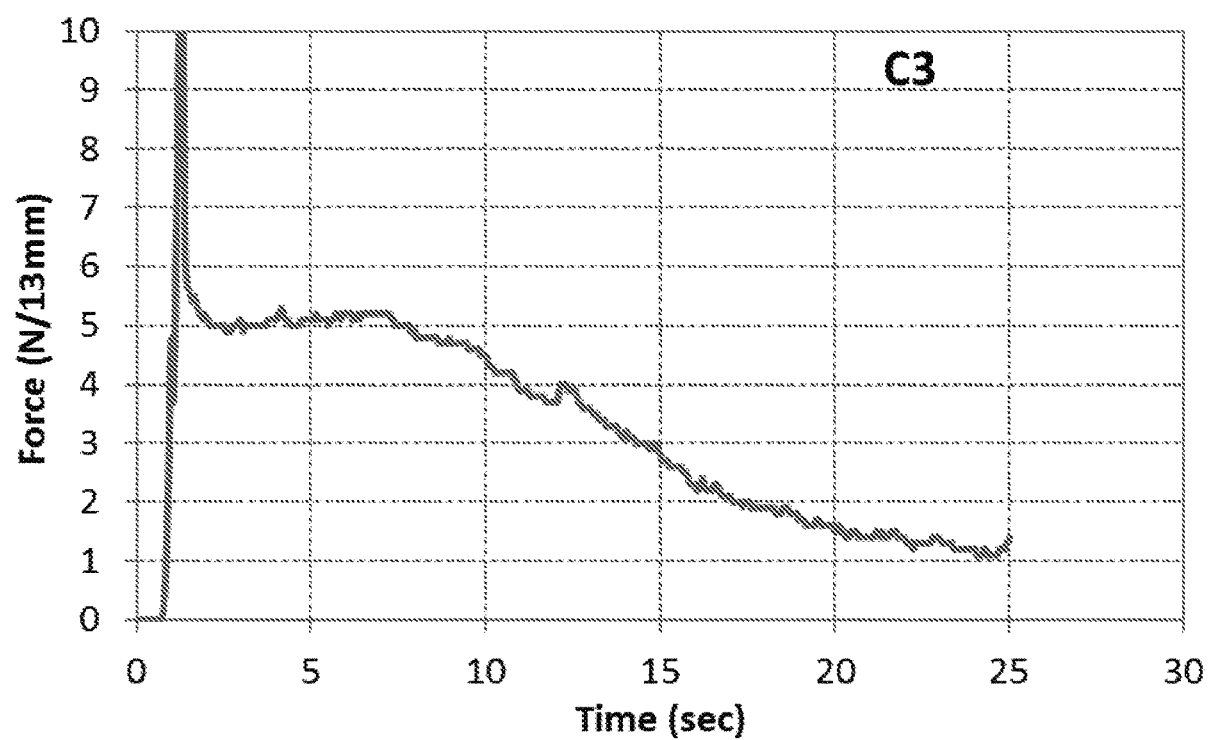
FIG. 4. Is a peeling strength density vs. time plot of an embodiment of a compound described herein being tested in the device shown in FIG. 3.

In a dynamic test, the voltage was applied a few seconds after the peeling or separation starts and the time and peeling strength readings from the force gauge are recorded by the data acquisition system (Mark-10 MESURgauge Plus). FIG. 4 shows the 180 deg. peeling strength evolution with time when a 10 VDC was applied to the adhesive material that is doped with Compound C3 with a concentration of 5 wt. %.

In a static debonding test, the sample was fixed on to the tester and connected to the power supply in the same way. The initial 180 deg. peeling was measured at the same peeling speed. Then peeling was stopped. A DC voltage (10 VDC for example) was applied for some time (10 second for example). And then the peeling strength was measured at the same peeling speed of 300 mm/min. For the same adhesive sample from compound C3, the initial peeling strength is 5.0 N/cm; while the residual adhesion peeling strength is 1 after applying 10 VDC for 10 second.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

What is claimed is:

1. An adhesive composition comprising:
a cationic ammonium compound of the following formula:

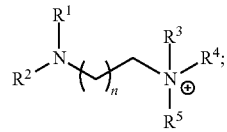

wherein:
$R^1$, $R^2$, $R^3$, $R^4$ and $R^5$ are independently H, optionally substituted $C_{1-5}$ hydrocarbyl, optionally substituted $C_{1-5}$ hydrocarbyl-OH, or optionally substituted $C_{1-5}$ hydrocarbyl-O—$C_{1-5}$ hydrocarbyl, wherein n is 1 or 2; and
a sulfonimide anion of the following formula:

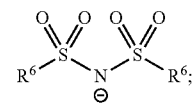

wherein:
$R^6$ is —F or $C_{1-3}$ fluorohydrocarbyl.

2. The adhesive composition of claim 1, wherein $R^1$, $R^2$, $R^3$, $R^4$ and $R^5$ are independently H, —$CH_3$, —$CH_2CH_3$, —$CH_2CH_2CH_3$, —$CH_2OCH_3$, —$CH_2CH_2OCH_3$, —$CH_2OCH_2CH_3$, —$CH_2CH_2CH_2OCH_3$, —$CH_2OCH_2CH_2CH_3$, —$CH_2CH_2OCH_2CH_3$—$CH_2CH_2CH_2OCH_2CH_3$, —$CH_2CH_2CH_2OCH_2CH_2CH_3$, or —$CH_2CH_2OCH_2CH_2CH_3$, —$CH_2OH$, —$CH_2CH_2OH$, —$CH_2CH_2CH_2OH$, or —$CH_2CH_2CH_2CH_2OH$.

3. The adhesive composition of claim 2, wherein the cationic ammonium compound is:

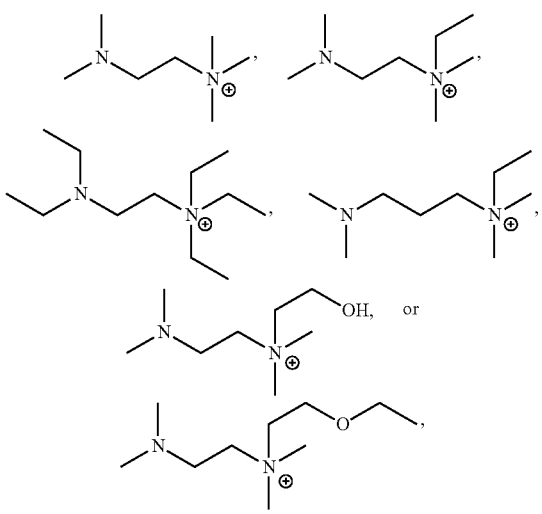

or a combination thereof.

4. The adhesive composition of claim 3 wherein $R^6$ is F.

5. The adhesive composition of claim 1, further comprising a polymer wherein the polymer comprises an acrylate polymer, a methacrylate polymer, or a combination of both acrylate and methacrylate polymers.

6. The adhesive composition of claim 5, wherein the polymer comprises acrylic acid, C1-14 hydrocarbyl acrylate or C1-14 hydrocarbyl methacrylate monomers.

7. The adhesive composition of claim 6, wherein the polymer is crosslinked with an epoxy crosslinker; wherein the epoxy crosslinker is N,N,N',N'-tetraglycidyl-m-xylenediamine.

8. A structure comprising: 1) a first electro-conductive surface, 2) a second electro-conductive surface, and 3) the adhesive composition of claim 7 disposed between the first electro-conductive surface and the second electro-conductive surface.

9. The structure of claim 8, further comprising a power supply wherein at least one of the first electro-conductive surface and the second electro-conductive surface are in electrical communication with a DC power supply, creating a closeable electrical circuit, and wherein the DC power supply is about 3 volts to about 100 volts.

10. The structure of claim 9, wherein the first electro-conductive surface or the second electro-conductive surface comprises an electro-conductive metal, a mixed metal, an alloy, a metal oxide, a mixed metal oxide, a plastic, a carbonaceous material, a composite metal, or a conductive polymer.

11. The structure of claim 10, wherein the electro-conductive material comprises aluminum.

12. The structure of claim 10, wherein the application of an electromotive force to the electro-conductive surface reduces the adhesion of the adhesive composition.

13. The structure of claim 12, wherein the first electro-conductive surface is a surface of a first electro-conductive layer and the second electro-conductive surface is a surface of a second electro-conductive layer, wherein the first electro-conductive layer and the second electro-conductive layer are about 20 nm to about 200 µm thick.

14. The structure of claim 13, wherein the electro-conductive layers are disposed upon a substrate wherein the substrate comprises wood, cardboard, fiberglass or non-electro-conductive plastic.

15. The structure of claim 14, wherein the adhesive composition has a reduced corrosive effect upon the first electro-conductive surface or the second electro-conductive surface.

16. The structure of claim 15, wherein the reduced corrosive effect is observable under conditions of high humidity and high temperature over a period of about 15 minutes to about 300 hours.

17. An adhesive member comprising:
the adhesive composition of claim 7 formed into an adhesive layer; and
at least one release liner on at least one side of the adhesive layer.

18. The adhesive member of claim 17, comprising a release liner on each side of the adhesive layer.

19. A method of adhering the adhesive composition of claim 7, to a substrate, the method comprising:
applying the adhesive composition to a first electrically conductive substrate; and
applying the adhesive composition to a second electrically conductive substrate such that the adhesive composition is between the first electrically conductive substrate and the second electrically conductive substrate.

* * * * *